Figure 1:
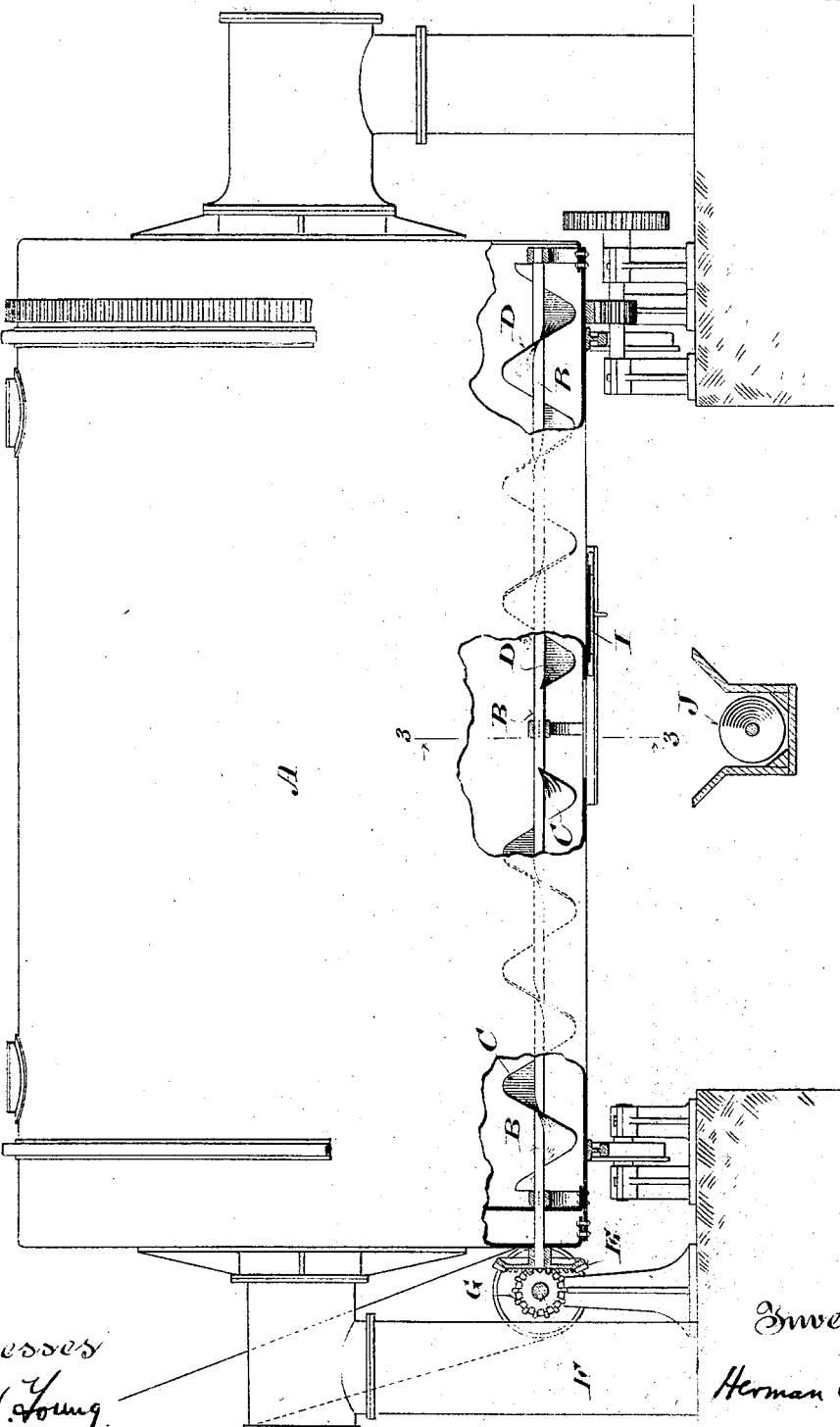

No. 764,828. PATENTED JULY 12, 1904.
H. SCHREIER.
MALTING DRUM.
APPLICATION FILED MAY 7, 1904.
NO MODEL. 2 SHEETS—SHEET 1.

Witnesses
Geo. W. Young
R. J. Barsch.

Inventor
Herman Schreier
By H. G. Underwood
Attorney

No. 764,828. PATENTED JULY 12, 1904.
H. SCHREIER.
MALTING DRUM.
APPLICATION FILED MAY 7, 1904.
NO MODEL. 2 SHEETS—SHEET 2.
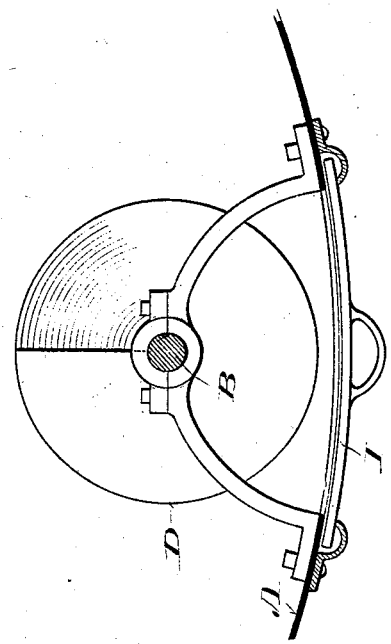
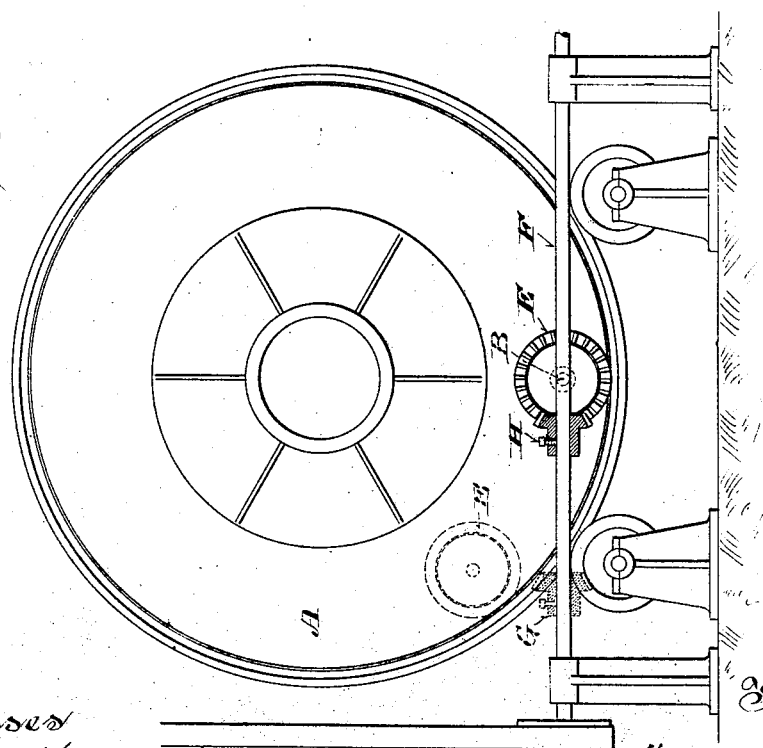

No. 764,828. Patented July 12, 1904.

UNITED STATES PATENT OFFICE.

HERMAN SCHREIER, OF SHEBOYGAN, WISCONSIN.

MALTING-DRUM.

SPECIFICATION forming part of Letters Patent No. 764,828, dated July 12, 1904.

Application filed May 7, 1904. Serial No. 206,853. (No model.)

*To all whom it may concern:*

Be it known that I, HERMAN SCHREIER, a citizen of the United States, and a resident of Sheboygan, in the county of Sheboygan and State of Wisconsin, have invented certain new and useful Improvements in Malting-Drums; and I do hereby declare that the following is a full, clear, and exact description thereof.

My invention has for its object to facilitate the discharge of the contents of rotary pneumatic malting-drums; and it consists in what is hereinafter particularly set forth with reference to the accompanying drawings and subsequently claimed.

Figure 1 represents a partly-broken side elevation of a rotary pneumatic malting-drum provided with inner right and left spiral conveyers that feed to a central discharge-opening of the drum when actuated by suitable gearing the same or the equivalent of that herein shown, said drum being then at rest in discharge position; Fig. 2, an end elevation of the drum and said gearing, partly in section; and Fig. 3, a detail partly-sectional view indicated by line 3 3 in the first figure.

Referring by letter to the drawings, A indicates a rotary pneumatic malting-drum mounted in the usual manner and driven by the usual means. Arranged in suitable bearings to be for the most part within the drum is the shaft B of right and left spiral conveyers C D, that are close to the inner circle of said drum. These conveyers extend from adjacent to the ends of the grain-space within the drum to the discharge-opening of said drum, and one end of their shaft extending through a drum-head has a bevel gear-wheel E fast thereon. Arranged in suitable bearings outside the drum is a shaft F, that is driven by pulley-and-belt gear or other suitable means. Adjustable on the shaft F is a bevel gear-pinion G, and a set-screw H is employed to hold the pinion in adjusted position. The shaft F extends crosswise of the drum, and its arrangement is such that the pinion G may be put in and out of mesh with the gear-wheel E aforesaid. When not in working position, the pinion G is adjusted on the shaft F to afford clearance for the gear-wheel E while the drum is in rotation, the two positions of said pinion being shown by full and dotted lines in Fig. 2. The drum being brought to rest with its discharge-opening downward and the covering-slide I for said opening moved back in its guides, the pinion G is adjusted on the shaft F to mesh with the gear-wheel E, and motion being imparted to said shaft the conveyers C D are run to automatically feed the contents of said drum to said discharge-opening of same, another conveyer J being shown in position to receive the escaping material.

From the foregoing it will be understood that the conveyers C D are idle when the drum is in rotation, and while I have shown a preferred means for connecting said conveyers with a drive mechanism other means may be utilized for the same purpose, and the mounting of shaft of said conveyers may be varied from what is herein illustrated without departure from the scope of my invention.

Having thus described my invention, what I claim as new, and desire to secure by Letters Patent, is—

1. A rotary malting-drum provided with an inner spiral conveyer arranged to feed to the discharge-opening of the drum and having its shaft extended through a drum-head for connection with drive mechanism when said drum is at rest in discharge position.

2. A rotary malting-drum provided with inner right and left spiral conveyers having a shaft common to both extended through a drum-head, the feed of the conveyers being toward a discharge-opening midway of the length of the drum and the protruding end of the shaft designed for connection with drive mechanism when said drum is at rest in discharge position.

3. A rotary malting-drum provided with inner right and left spiral conveyers that feed toward a central discharge-opening in the drum and have a shaft common to both extended through a drum-head, a bevel gear-wheel fast on the protruding end of the shaft, an external shaft, a bevel gear-pinion adjustable on the external shaft to be put in and out of mesh with said gear-wheel, and means for driving said external shaft, the pinion being adjusted out of working position far enough to clear the aforesaid gear-wheel when said drum is in rotation.

In testimony that I claim the foregoing I have hereunto set my hand, at Sheboygan, in the county of Sheboygan and State of Wisconsin, in the presence of two witnesses.

HERMAN SCHREIER.

Witnesses:
L. P. STEFFEN,
L. ZIMMERMANN.